E. T. MOORE.
SYSTEM OF PRESSURE REGULATION.
APPLICATION FILED APR. 23, 1915.
1,376,455.
Patented May 3, 1921.
2 SHEETS—SHEET 2.
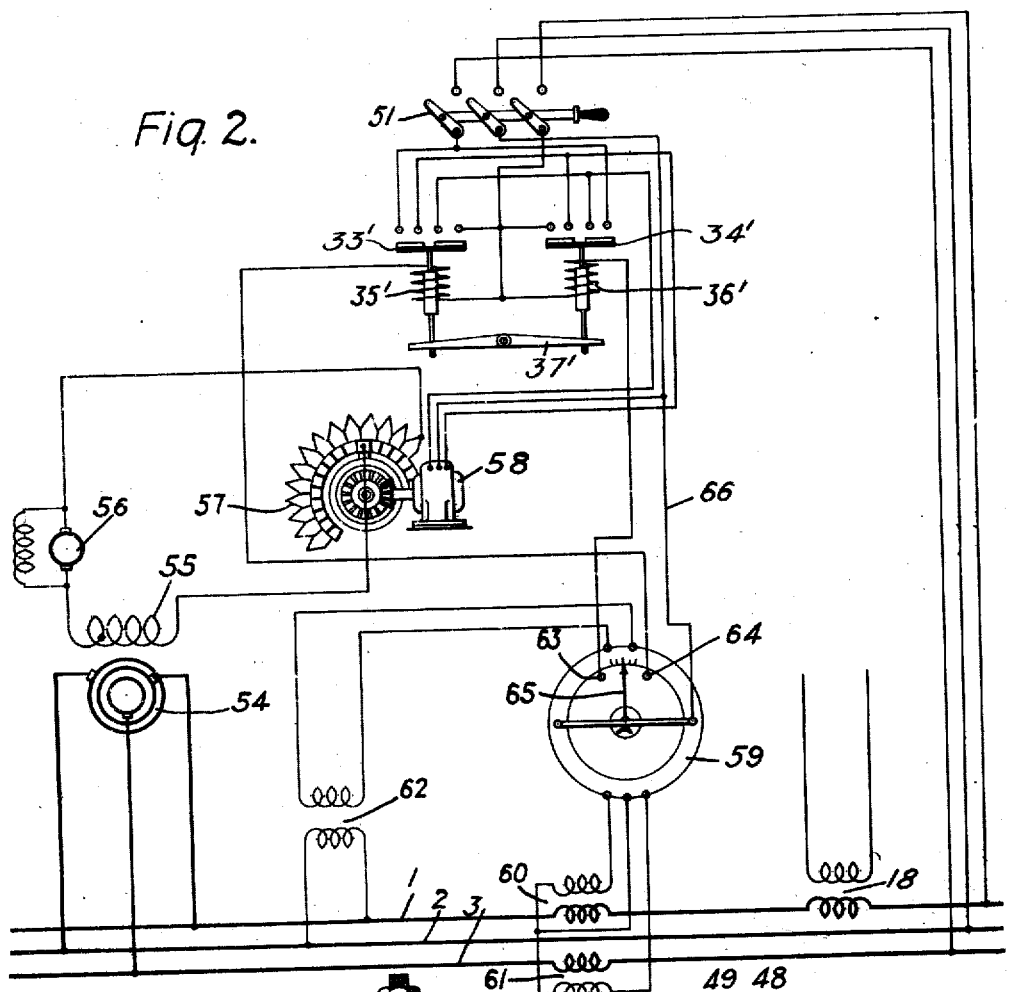
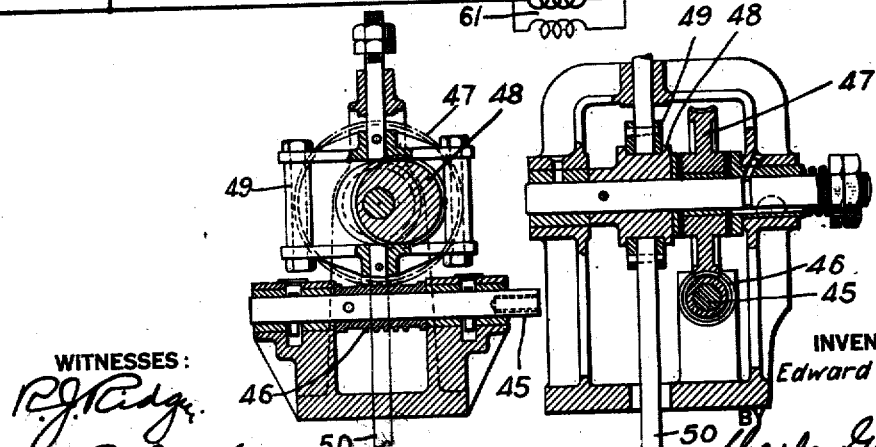
WITNESSES:
INVENTOR
Edward T. Moore
ATTORNEY

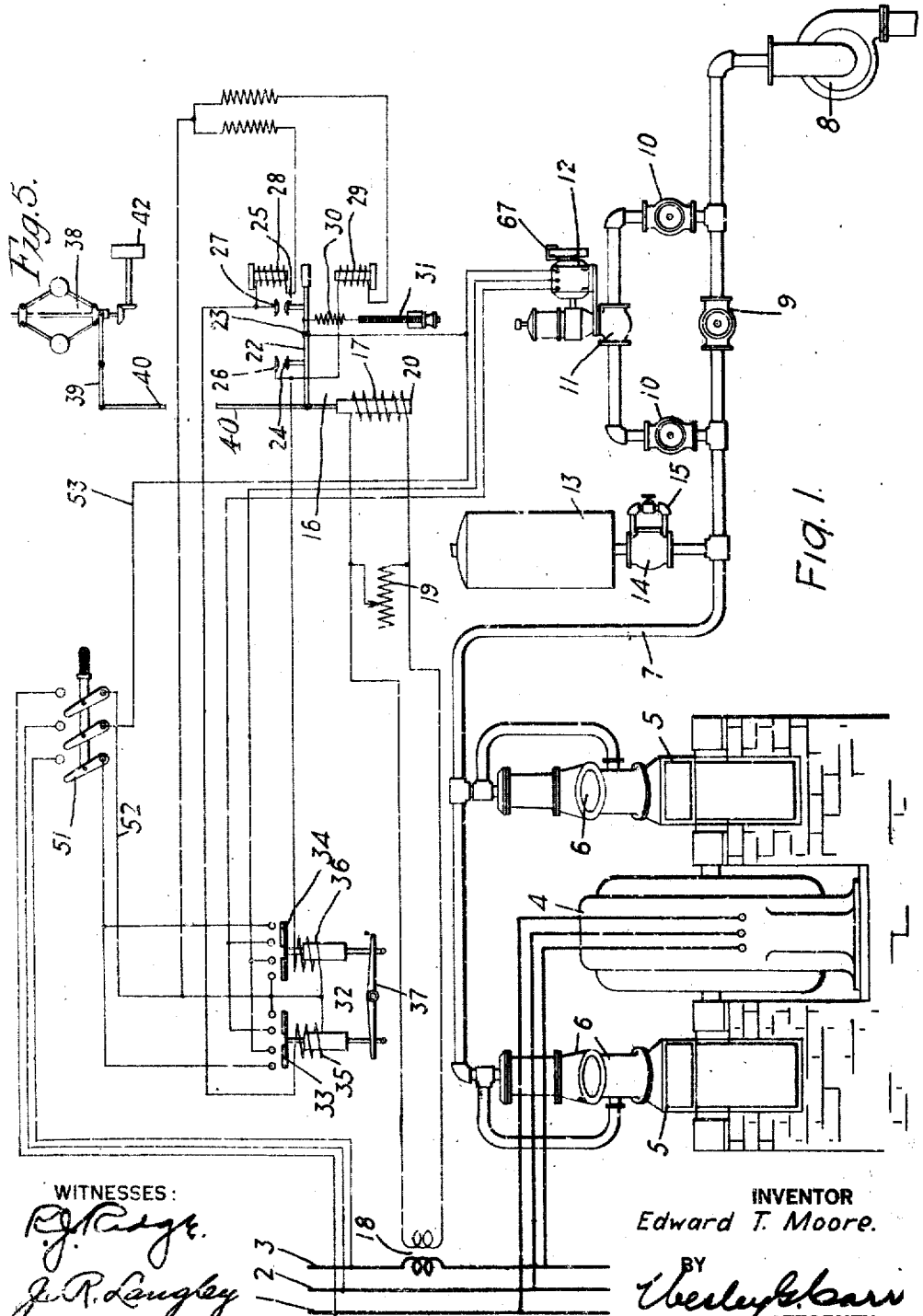

UNITED STATES PATENT OFFICE.

EDWARD T. MOORE, OF SYRACUSE, NEW YORK, ASSIGNOR TO WESTINGHOUSE ELECTRIC AND MANUFACTURING COMPANY, A CORPORATION OF PENNSYLVANIA.

SYSTEM OF PRESSURE REGULATION.

1,376,455.  Specification of Letters Patent.  Patented May 3, 1921.

Application filed April 23, 1915. Serial No. 23,387.

*To all whom it may concern:*

Be it known that I, EDWARD T. MOORE, a citizen of the United States, and a resident of Syracuse, in the county of Onondaga and State of New York, have invented a new and useful Improvement in Systems of Pressure Regulation, of which the following is a specification.

My invention relates to systems of pressure regulation, and it has particular reference to such systems as may be employed in connection with pulpwood grinders or similar machines that are motor driven.

My invention has for its object to provide a system of the character indicated above which operates to maintain a substantially uniform load upon a motor-driven mechanism.

In the operation of pulpwood grinders or similar machines that are driven by electric motors, it has been found that the load varies between wide limits if no suitable regulating means is employed. In case electric power is purchased upon the basis of the maximum demand, the peaks in the value of the power supplied to the motor are caused by the variations in load upon the driven mechanism.

It has been found also, that the system, as a whole, is inefficient because of the "valleys" or variations in load below a normal value. The employment of a suitable regulating means for maintaining a substantially uniform load effects a considerable saving in the cost of electric power because of the reduction of the excessive values of current supplied to the motor. The system is rendered more efficient because it is operated continuously at substantially its normal capacity.

My invention is particularly adapted to be employed in connection with pulpwood grinders in which the load is regulated by the pressure of water supplied to its cylinders. The pressure of the water thus supplied is regulated by means of a valve controlled in accordance with the power supplied to an electric motor for driving the grinder. The valve is controlled by a motor which rotates in opposite directions according as the power supplied to the motor varies in either direction from a predetermined value.

The details of my invention will be described in connection with the accompanying drawings in which Figure 1 is a diagrammatic view of circuits and apparatus employed in connection with my invention. Fig. 2 is a view, similar to Fig. 1, of a modification. Figs. 3 and 4 are views, in section, of the valve-operating mechanism. Fig. 5 is a diagrammatic view of speed-responsive apparatus.

Line conductors 1, 2 and 3, which may be connected to any suitable source of alternating current, supply energy to an electric motor 4 which may be, for example, an induction motor. The motor is directly connected to a pair of pulpwood grinders 5 having cylinders 6. It will be understood that the particular mechanisms to be driven by the motor or the number of them is immaterial, the pulpwood grinders being shown by way of example only. The cylinders 6 are supplied with water through a pipe line 7 that is connected to any suitable source, as, for example, a centrifugal pump 8.

The pipe line 7 is controlled by a cut-off valve 9 and a by-pass for the valve 9 which comprises a pair of cut-off valves 10 and a controlling valve 11 that is actuated by an electric motor 12. While any suitable valve mechanism may be employed, the regulating valve 11 is preferably of the well-known balanced-piston type which is not affected by the pressure of the water in the system. The valve may, also, be so arranged as to either gradually increase or decrease the rate of its opening in order that a gradual change in pressure may be effected. Such an arrangement avoids disturbance of the hydraulic equilibrium and the resultant fluctuations in the system.

A tank 13, which is connected to any suitable source of compressed air, is connected to the pipe line 7 by means of a check-valve 14, which opens only to admit water into the tank 13, and a by-pass 15 around the valve 14. The motor 12 is controlled, in accordance with the current traversing the line conductors 1, 2 and 3, by means of a relay switching mechanism 16. The function of the tank 13 is to prevent hunting or oscillation of the controlling relay 16 because of changes in pressure in the pipe line 7 that are produced as hereinafter described.

The relay switch 16 comprises a coil 17 that is connected to the line conductor 1 by means of a suitable current transformer 18. A variable resistor 19, which is connected across the terminals of the coil, serves to adjust the energization of the coil 17 and to thereby adjust the value of the current at which the relay mechanism is adapted to operate. A core member 20 for the coil 17 is connected to a lever 22 that has a pivotal support indicated at 23. The lever 22 is provided with contact members 24 and 25 which coact respectively with stationary contact members 26 and 27, in accordance with the position of the core member 20.

The operative positions of the lever 22 are accentuated by the force of two electromagnets 28 and 29, the respective holding coils of which are energized when the corresponding pairs of contact members are in engagement. A spring 30, which is controlled by an adjustable screw 31, tends to maintain the lever 22 in a neutral position, with the contact members 24 and 25 in their respective inoperative positions.

A secondary switch mechanism 32, which is controlled by the relay switch 16, constitutes a reversing mechanism for the motor 12 which controls the valve 11. Switch members 33 and 34 are respectively provided with actuating coils 35 and 36 for reversing the connections of the motor 12. The switch members 33 and 34 are mechanically interlocked by a pivoted bar 37.

In case a water wheel is employed, instead of the electric motor 4, as a prime mover for the grinders 5, the relay mechanism 16 is controlled by a speed-responsive mechanism that is connected to the lever 22. This mechanism, which is illustrated in Fig. 5, comprises a centrifugal governor 38 that is connected to the lever 22 by means of a lever 39 and a rod 40. The centrifugal governor 38 is geared to a rotatable member 42 that may be operatively connected, in any suitable manner, to the water wheel. It will be readily understood that the speed-responsive mechanism is disconnected from the lever 22 when an electric motor is employed as the prime mover and that the coil 17 is not connected in circuit when a water wheel actuates the grinders.

The details of the valve-controlling mechanism are illustrated in Figs. 3 and 4. The motor 12 is connected to a shaft 45 which carries a worm 46. A worm wheel 47, which coacts with the worm 46, is connected to an eccentrically mounted disk 48. A reciprocable frame 49 surrounds the disk 48 and is connected to the stem 50 of the valve 11. It will be obvious that the vertical position of the stem 50 and the degree of opening of the valve 11 are determined by the angular position of the eccentric disk 48. This arrangement permits the motor 12 to be operated at a suitable speed to produce the desired adjustment of the valve 11.

In the operation of the system above described, the load upon the grinders 5 varies in accordance with the pressure of the water supplied through the pipe line 7. The current supplied to the motor 4 varies in accordance with the load upon the grinders. It may be assumed, for example, that the normal load of the motor is 500 K. W. and that the relay switch mechanism 16 has been adjusted to maintain its neutral position when the power supplied to the motor corresponds to this value. The downward pull exerted by the coil 17 is then balanced by the force of the spring 30.

If the load on the motor 4 is such that the power supplied to the motor exceeds the predetermined value of 500 K. W., the coil 17 will be energized to an increased degree to draw the core member 20 downwardly and thereby effect the engagement of the contact members 25 and 27. A circuit is thus completed which extends from the line conductor 1 through a switch 51, conductor 52, coil 35, contact members 27 and 25, lever 22, conductor 53 and switch 51 to line conductor 2. The coil 35 is thereby energized to effect the engagement of the switch member 33 with the coacting contact members and thereby complete the circuit of the motor 12. It will be noted that the line conductor 2 is connected directly to the motor 12 while the line conductors 1 and 3 are connected to the motor through the switch member 33.

The motor 12 then operates in such direction as to partially close the valve 11 and thereby decrease the pressure in the pipe line 7. The decrease in pressure causes a smaller amount of water to be supplied to the cylinder 6, and the load upon the grinders 5 is correspondingly reduced. If the valve 11 should be closed at such a rate that the pressure in the pipe line 7 is considerably reduced, water flows through the bypass 15 in an amount depending upon the opening of the valve included therein, to tend to maintain the pressure in the pipe line at a uniform value.

When the power supplied to the motor falls to the predetermined value, the coil 17 is deënergized to a corresponding degree and the lever 22 will be returned to its normal position by the spring 30. The separation of the contact members 27 and 25 opens the circuit of the coil 35, and the switch member 33 opens the circuit of the motor 12. An electromagnetic brake 67, which may be controlled in any usual or suitable manner, brings the motor to rest upon the opening of the motor circuit.

If the load upon the grinders should decrease to such an amount that the power delivered to the motor 4 is less than 500 K. W., the lever 22 will be actuated by the spring 30 to effect the engagement of the contact members 24 and 26. A circuit, which is thus completed, extends from the line conductor 1 through switch 51, conductor 52, coil 36, contact members 26 and 24, lever 22, conductor 53 and switch 51 to line conductor 2. The switch member 34 is then actuated into engagement with the coacting contact members to complete the motor circuit for rotation in the direction opposite to that previously described.

The valve 11 is then opened to admit an increased quantity of water to the cylinders 6 and thereby increase the load. If the pressure in the pipe line 7 exceeds that of the tank 13, water will flow through the check-valve 14 until the pressure within the tank 13 corresponds to that of the pipe line. When the pressure in the pipe line is less than that of the tank 13, water flows through the by-pass 15 until the pressures are equal. The by-pass 15 is preferably so adjusted as to permit water to flow out of the tank at a rate materially lower than that at which it is permitted to flow into the tank through the check valve 14. This arrangement insures that sudden surges or increases in pressure in the pipe line are absorbed readily. Any tendency of the system to hunt or oscillate is effectually prevented by permitting fluid to pass into and out of the tank at different rates. When the power delivered to the motor 4 reaches approximately the normal value, the coil 17 will be energized to a corresponding degree, and the core member 20 will be drawn downwardly to actuate the lever 22 to its normal or neutral position.

The provision of valve-controlling means that is deënergized and, therefore, inactive when the current traversing the motor current does not vary appreciably from the predetermined value causes the system to operate more steadily than is the case with an arrangement in which the controlling means is responsive to slight or minor fluctuations of a temporary character.

It has been found, in practice, that the load upon the motor 4 may be maintained substantially uniform, thereby materially reducing the cost of electric power because of the smaller maximum demands. The system is highly efficient because the motor does not, at any time, operate at materially less than its predetermined load. The tank 13 effectually prevents oscillation or hunting of the system by reason of the regulating action of the relay mechanism 16.

A modification of my invention, in which a synchronous motor is employed as the prime mover, is illustrated in Fig. 2. It is well known that, in the operation of a synchronous motor, the power supplied to it is not always proportional to the current traversing its circuit. In such cases, the power factor of the circuit is said to vary from unity. If a synchronous motor is employed in connection with a regulating mechanism, such as that described in connection with Fig. 1, it is necessary to provide a suitable means for compensating for the variation of the power factor from unity or for regulating the power factor of the motor circuit.

In the system illustrated in Fig. 2, the relay switch 16 and its connected parts, with the exception of the current transformer 18 and the mechanical structures illustrated in Fig. 1 are omitted, their illustration being unnecessary to an understanding of the system of Fig. 2. The primary member of a synchronous motor 54, which is connected to the line conductors 1, 2 and 3, has a separately excited field winding 55. The field winding 55 is energized by an exciter generator 56 which is in circuit with a variable resistor 57. The resistor 57 is controlled by a pilot motor 58.

A power factor meter 59, which may be of any well known type, is connected to the line conductors 1, 2 and 3 by current transformers 60 and 61 and a voltage transformer 62. The power factor meter 59 is provided with adjustable contact members 63 and 64 which are engaged by a movable pointer 65 when the power factor of the circuit varies from unity by a predetermined value. The contact members 63 and 64 are respectively connected in circuit with coils 36' and 35' of a secondary switch mechanism, similar to that described in connection with Fig. 1, for controlling the pilot motor 58.

It may be assumed that the motor 54 is driving the grinders 5 in the same manner as that described in connection with the motor 4 of Fig. 1. In case the circuit conditions are such that value of the power factor, as indicated by the meter 59, falls below unity, the pointer 65 moves in a counter-clockwise direction. When the variation reaches a predetermined amount, the pointer 65 engages the contact member 63 to close a circuit extending from the line conductor 2 through switch 51, conductor 66, pointer 65, contact member 63, coil 36' and switch 51 to line conductor 1.

The coil 36' is thereby energized to actuate the switch member 34' upwardly to complete a circuit for the pilot motor 58. The effective portion of the resistor 57 is then decreased in order to increase the excitation of the field winding 55. The result is to cause the power factor to increase, and the pointer 65 will be actuated to its central or inoperative position. The separation of the pointer 65 and the contact member 63 opens the circuit of the coil 36', and the switch member 34' opens the circuit of the pilot motor 58, whereupon the latter comes to rest.

When the power factor has a value that exceeds unity by a predetermined amount, the pointer 65 engages the contact member 64 to complete a circuit for the coil 35' which is similar to that described in connection with the coil 36'. The switch member 33' is then closed to complete a circuit for the pilot motor 58, but the connections of two of the phases are reversed. The motor then operates in the reverse direction from that previously described to insert resistance in circuit with the field winding 55 and thereby decrease its excitation.

By means of the arrangement just described, the power factor of the motor circuit is maintained substantially at unity. The relay switch mechanism 16, which is adjusted for a predetermined value of current based on the normal load of the motor when the power factor is unity, operates with approximately the same degree of accuracy that is possible with a circuit in which the power factor is unity or has a substantially constant value.

Various modifications may occur to those skilled in the art to which my invention appertains, and it is understood that such modifications may be made as fall within the scope of the appended claims without departing from the spirit of my invention.

I claim as my invention:

1. In an electrical system, the combination with a driven mechanism, fluid-pressure means for controlling the load upon said mechanism and an electric motor for driving said mechanism, of a valve for controlling said fluid-pressure means, a motor for actuating said valve, means for controlling said actuating motor, said controlling means comprising a reversing mechanism for said actuating motor, and an electromagnetic relay for effecting the operation of said reversing mechanism when the load upon said driving motor exceeds or falls below a predetermined value, and a pressure chamber connected to said fluid-pressure means for preventing oscillations of said relay.

2. In an electrical system, the combination with a driving mechanism, fluid-pressure means for controlling the load upon said mechanism and an electric motor for driving said mechanism, of a valve for controlling said fluid-pressure means, a motor for actuating said valve, means for controlling said actuating motor, said controlling means comprising a reversing mechanism for said actuating motor and an electromagnetic relay for effecting the operation of said reversing mechanism when the load upon said driving motor exceeds or falls below a predetermined value, said relay having an actuating coil controlled in accordance with the current traversing said driving motor, and a pressure chamber for preventing oscillations of said relay, said chamber being connected to said fluid-pressure means by a check valve and a by-pass valve, said check valve being adapted to admit fluid at a predetermined rate from said fluid-pressure means to said chamber, and said by-pass valve being adapted to return fluid to said fluid-pressure means at a second, smaller, predetermined rate.

3. The combination with a motor, and a mechanism to be driven thereby, of means for maintaining a substantially uniform load upon said mechanism, said means comprising a source of fluid-pressure, automatic means for varying the pressure exerted by said source, and a second source of fluid-pressure for preventing oscillations of said automatic means.

4. The combination with an electric motor and a mechanism driven thereby, of means controlled by the current traversing said motor for maintaining a predetermined load upon said mechanism and means for controlling the field excitation of said motor in accordance with the value of the power factor of the motor circuit, said means comprising a resistor, a power-factor meter and means for adjusting the value of said resistor when the power-factor meter indicates a value which varies from unity by a predetermined amount.

5. The combination with an electric motor and a mechanism driven thereby, of means controlled by the current traversing said motor for maintaining a predetermined load upon said mechanism, and means for maintaining the power factor of the motor circuit substantially constant.

In testimony whereof, I have hereunto subscribed my name this seventeenth day of April, 1915.

EDWARD T. MOORE.